3,049,435
PROCESS FOR APPLYING TUNGSTEN CARBIDE PARTICLES TO A WORKPIECE SURFACE
Warren M. Shwayder, 684 E. Woodbridge, Detroit, Mich.
No Drawing. Filed Aug. 19, 1957, Ser. No. 679,052
4 Claims. (Cl. 117—22)

This invention relates to a process for applying tungsten carbide particles to a workpiece surface.

It is a conventional process to hard surface various types of cutting or wearing surfaces by means of welding tungsten carbide particles to the surface. The conventional process normally consists of heating tungsten carbide to above the 3000° C. melting point of the tungsten carbide and then casting the molten material into shot, which is then crushed into tiny particles ranging from 12 mesh to 100 mesh. Thereafter, these tiny particles are welded to the workpiece surface by the use of conventional welding torches or the like.

The disadvantage with the conventional process is that a large part of the tungsten carbide material is lost by vaporization, oxidation or dissolution during the welding process to form compositions of iron and tungsten carbide which do not have the hardness or abrasion resistance of the original tungsten carbide particle. Also, where a workpiece is formed of a ferrous material, the ferrous material acts as a dissolving agent for the tungsten carbide so that a great part of the tungsten carbide is dissolved into the molten ferrous material during the welding process at the point where the heat is applied. Thus, only a very small part of the original tungsten carbide actually remains on the surface of the workpiece to form the hard coating which is desired. Since the price of tungsten carbide is extremely high, the loss of this material is an extremely expensive loss.

Attempts have also been made to braze tungsten carbide particles to a workpiece surface, but these attempts have, for the most part been unsuccessful because the tungsten carbide is not readily wettable and thus, the brazing material will not adhere to the particles.

Thus, it is an object of this invention to apply particles of tungsten carbide to a workpiece surface to thereby provide a hard surface, but in so doing, to prevent the loss of tungsten carbide entirely or to hold this loss to an absolute minium so that for all practical purposes there is no loss.

In addition, it is an object of this invention to treat the tungsten carbide particles by surface coating them with nickel or nickel-nickel phosphide so that they become wettable and may be welded or brazed to a workpiece surface.

These objectives are achieved by completely coating the tungsten carbide particles with nickel or with nickel-nickel phosphide. This coating acts as a sacrificial material which evaporates, oxidizes, and also dissolves in iron. Thus, in application of the particles to a workpiece there is almost no loss of tungsten carbide. Likewise, the coated tungsten carbide particles are wettable and in the case of nickel-nickel phosphide, self-fluxing to some extent whereby they may be easily brazed to a workpiece.

Another object of this invention is to form particles of tungsten carbide, suitable for use in hard surfacing workpieces, by crushing pieces of cemented tungsten carbide raw material and then surface coating the particles with nickel as mentioned above. The crushed particles normally consist of a number of tiny particles of tungsten carbide, each somewhere in the order of 2 to 12 microns in size, cemented together by approximately 5% to 25% by weight of cobalt. The large pieces of cemented tungsten carbide may be crushed mechanically into small size particles in the approximate range of ¼ inch to minus 325 mesh as will be explained below.

These and other objects of this invention will become apparent upon reading the following description:

*Forming the Nickel Coated Tungsten Carbide Particles*

The raw material particles for this process may consist of either pieces of tungsten carbide or large pieces or chunks of cemented tungsten carbide. Where the first is used, the tungsten carbide is heated to above its melting point of approximately 3000° C. and then cast into pieces which are subsequently crushed into tiny particles which may range in size from ¼ inch to minus 325 mesh. This is a conventional process of forming these tiny particles. The preferred raw material, however, is cemented tungsten carbide which consists of large pieces of tungsten carbide containing tiny particles of approximately 2 to 12 micron size pieces of tungsten carbide cemented together by approximately 5 to 25%, by weight, of cobalt. These cemented pieces are crushed into the desired mesh size ranging from approximately ¼ inch to approximately minus 325 mesh and are then used as the raw material.

The raw material particles are then completely coated with nickel or nickel-nickel phosphide. The nickel coating can be obtained by dipping the particles in an electrolytic bath containing nickel arranged to deposit a substantially pure nickel plating on the outside surfaces of each of the particles. In the alternative, the particles can be nickel plated by the use of the chemical process described in the patent to Brenner et al., No. 2,532,283 of December 5, 1950. Where the chemical process is used, the coating is in the form of a nickel phosphorus alloy which contains nickel phosphide; the coating containing approximately 5 to 14% phosphorus, by weight.

In each of the coating methods, the tungsten carbide particles are completely coated with a very thin coating of nickel. The thickness of the coating is not particularly critical, but the surfaces should be as completely coated as possible. Thus, the time for dipping the particles in the electrolytic bath coating will be simply that length of time necessary to form a complete coating, regardless of thickness of coating.

*Hard Surfacing of Workpieces by Welding*

The nickel coated tungsten carbide particles may then be applied to a workpiece by means of placing a number of the particles upon the surface of the workpiece and heating the particles and the workpiece surface with a conventional welding torch. The heat of welding which is quite high and would probably exceed the 3000° C. melting point of the tungsten carbide and thereby cause evaporation and oxidation or solution of the tungsten carbide instead causes the nickel coating to fuse with the workpiece surface and it is the nickel coating which either evaporates or oxidizes or in the case of a ferrous workpiece, dissolves so that the tungsten carbide remains to form a hard surface. With this process there is little or no loss of tungsten carbide and since this tungsten carbide material is quite expensive, there is a large cost saving.

*Hard Surfacing by Flame Spraying*

Alternatively, the particles may be applied to a workpiece surface by spraying fine particles, somewhere in the range of approximately minus 150 mesh size, onto the workpiece and simultaneously flame heating the workpiece and particles. The flame spraying process of applying particles to a workpiece is known in the art. Where tungsten carbide particles are used, most of the particles do not stick to the workpiece but rather bounce off during the spraying process. What few particles do stick are further depleted by the loss due to oxidation, dissolution, and evaporation. However, by nickel coating the particles as herein described, the nickel coating, being melted by the heat as the particles travel towards the workpiece, cements the particle to the workpiece and any loss of material is sustained by the coating rather than by the expensive tungsten carbide. In some applications, a small amount of Colmonoy No. 6 (a nickel-silicon-boron alloy) made by the Colmonoy Company may be added to the particles to further act as an adhesive agent. This hard brazing material has a low melting point and a wide plastic range and thus increases the adhesion of the particles to the workpiece. The amount of Colmonoy No. 6 added, if any is desired for any particular application, depends upon the speed of flame spraying, the heat, the material of the workpiece, etc., and may be determined by test.

Hard Surfacing by Brazing

Alternatively, the nickel coated tungsten carbide particles may be applied to the workpiece surface by means of a brazing process. This can be accomplished by mixing the particles with a brazing powder in a dry unheated state and then brazing in the conventional way by applying the powder mixture to the surface of the workpiece then passing the workpiece through a brazing oven or the like, which is hot enough to melt the brazing material and cause it to fuse to the workpiece. The temperature and time required varies with the particular brazing material used and is determined by test.

Normally, tungsten carbide particles cannot be brazed to a workpiece because the tungsten carbide is not readily wettable by the brazing material. However, when the particles are nickel coated as herein disclosed, the nickel coating is wettable and thus, the nickel coated particle can be easily handled and brazed to a workpiece surface.

One sample brazing material which has been found suitable for this purpose is Allstate No. 13 made by the Allstate Company, which is a nickel bronze brazing powder or rod. Obviously, many other types of brazing material would operate for the purpose described. It is to be understood, that the brazing problem here is that of brazing nickel to the workpiece rather than tungsten carbide to the workpiece because the particles are coated with nickel and therefore any brazing material which would serve in brazing nickel to a workpiece would operate here.

Hard Surfacing With a Diamond Matrix

It is also contemplated to hard surface a workpiece by mixing the nickel coated tungsten carbide particles with diamond particles, plus a binder such as bronze or monel or iron or iron plus Colmonoy No. 6. The combination of the tungsten carbide and the diamond forms an excellent grinding wheel surface and also is excellent as a surface for core bits for oil well drilling, etc.

Advantages

As mentioned, the problems in using tungsten carbide are that the tungsten carbide is not readily wettable, and also, that there is a loss of tungsten carbide due to evaporation, oxidation, and dissolution in ferrous workpiece surfaces.

Nickel coating the tungsten carbide substantially eliminates the loss of the tungsten carbide mentioned above, as well as forms a wettable surface on the tungsten carbide particles. Thus, the particles may be easily used in the normal welding process or in the ordinary brazing processes to form a hard surface on a workpiece.

Where the particles are used in a brazing process, the phosphorus contained in the nickel-nickel phosphide coating on the particles acts as a flux so that the material is almost completely self-fluxing. Thus, the phosphorus reduces the melting point and since the particles contain approximately 5 to 14% phosphorus with the nickel in the chemical process type of coating, only a small amount of extra flux is required. For example, where phosphorus type fluxes are used, approximately 12% by weight is necessary with approximately 88% nickel to form a good self-fluxing brazing alloy. Since the particle coating already contains 12% phosphorus or close to 12% only a small amount of additional flux is needed.

This invention may be further developed within the scope of the following attached claims and accordingly, it is desired that the foregoing description be read as being an operative embodiment of this invention and not in a limiting sense.

I claim:
1. A process of applying tungsten carbide particles to a ferrous metal surface to impart thereto hard wearing and cutting properties comprising crushing the tungsten carbide to a particle size in the range of ¼ inch to 325 mesh, coating the particles with a thin continuous film of metallic nickel, and then applying the said particles to the ferrous metal surface with sufficient heat to fuse the nickel coating to the ferrous metal, thereby binding the particles to the surface.

2. The method of applying cemented tungsten carbide, having cobalt metal as the cementing matrix, to a ferrous metal surface to impart thereto hard wearing and cutting properties comprising first crushing the cemented tungsten carbide to a particle size in the range of ¼ inch to 325 mesh, coating the crushed cemented tungsten carbide particles with a thin continuous film of metallic nickel, and then applying the said particles to the ferrous metal surface with sufficient heat to fuse the nickel coating to the ferrous metal, thereby binding the particles to the surface.

3. The method as defined in claim 1 wherein the nickel coating upon the particles contains about 5 to 14 percent phosphorus.

4. The method as defined in claim 1 wherein the nickel coated tungsten carbide particles are further mixed with a low melting point hard brazing material before being applied to said ferrous metal surface.

References Cited in the file of this patent

UNITED STATES PATENTS

| 1,565,495 | Pfeil | Dec. 15, 1925 |
| 2,200,742 | Hardy | May 14, 1940 |
| 2,228,916 | Simons | Jan. 14, 1941 |
| 2,553,714 | Lucas | May 22, 1951 |
| 2,562,587 | Swearinger | July 31, 1951 |

FOREIGN PATENTS

| 596,626 | Great Britain | Jan. 7, 1948 |